(12) United States Patent
Vanhoutte

(10) Patent No.: US 6,457,600 B2
(45) Date of Patent: Oct. 1, 2002

(54) WEB-SHAPED RETAINER FOR A VEHICLE INTERIOR

(75) Inventor: Peter Vanhoutte, Varsenare (BE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 0 days.

(21) Appl. No.: 09/785,036

(22) Filed: Feb. 16, 2001

(30) Foreign Application Priority Data

Feb. 18, 2000 (DE) .......................................... 100 07 613

(51) Int. Cl.⁷ ............................................... B65D 81/00
(52) U.S. Cl. ...................................... 220/529; 206/298
(58) Field of Search ................................ 220/529, 530, 220/531, 550; 206/298

(56) References Cited

U.S. PATENT DOCUMENTS 2,016,688 A * 10/1935 Stellies ........................ 206/298
3,902,597 A * 9/1975 Brennan ...................... 206/298
4,946,036 A * 8/1990 Kupersmit ................... 206/298
5,725,119 A * 3/1998 Bradford et al. ............. 220/530
5,813,566 A * 9/1998 Bradford et al. ............. 206/298
6,024,241 A * 2/2000 Keillor ........................ 220/529

FOREIGN PATENT DOCUMENTS

EP          0 672 557           9/1995

* cited by examiner

Primary Examiner—Joseph M. Moy
(74) Attorney, Agent, or Firm—Herbert Dubno

(57) ABSTRACT

A web-shaped retainer for a vehicle interior has its holding bars foldable at tube segments connected by a hinge joint over which a sleeve is slidable to lock the segments in alignment against the force of a tension spring in one of the segments.

19 Claims, 3 Drawing Sheets

WEB-SHAPED RETAINER FOR A VEHICLE INTERIOR

FIELD OF THE INVENTION

My present invention relates to a web-shaped retainer for the interior of a motor vehicle, e.g. for limiting the movement of objects, articles or goods therein. More particularly the invention relates to a removable or dismountable retainer adapted to be positioned within an interior space of the motor vehicle.

BACKGROUND OF THE INVENTION

A web-shaped retainer which can be positioned within a motor vehicle and has a member spanning a pair of mounting bars and composed of a flexible material, usually an open work or netting, is described in EP 0 672 557 B1. The netting has opposite edges in which the upper and lower mounting bars are received.

The retainer described in this arrangement can be folded by bringing the bars together and thereby allowing the retainer to be removed and placed out of the way.

When the bar had to be foldable, a pin locking system was provided which was inconvenient to use and unaesthetic.

OBJECTS OF THE INVENTION

It is, therefore, the principal object of the present invention to provide a web-shaped retainer having the advantages of those described above which can be folded compactly and conveniently and allow the mounting bars to be folded in a convenient manner.

Another object of the invention is to provide a retainer for the purposes described which can be more easily folded and erected in place.

SUMMARY OF THE INVENTION

These objects are attained, in accordance with the invention by providing a hinge structure between bar segments of at least one of the mounting bars and a locking member in the form of a sleeve which is shiftable over the adjoining ends of these segments to maintain the segments aligned in the locking position, the sleeve being displaceable against a spring force into an unlocking position to enable the respective bar to be folded at the hinge joint. More particularly the web shaped retainer can comprise:

- a flexible retaining web adapted to span across an interior of a vehicle to retain objects therein and formed with opposite mounting edges; and
- at least one foldable bar supporting a respective one of the edges and subdivided at a separation between ends of the bar into two mutually alignable bar segments. The bar comprises:
  - a hinge joint interconnecting the segments and enabling one of the segments to be folded at the hinge joint over the other of the segments,
  - a locking sleeve slidable on a first of the segments and axially shiftable from an unlocked position wherein the sleeve is fully on the first of the segments over a second of the segments upon alignment of the segments to secure the segments in axial alignment in a locking position of the sleeve, and
  - a spring operatively connected to the sleeve for biasing the sleeve into the locking position, whereby the sleeve is displaceable from the locking position into the unlocked position against a spring restoring force.

According to a feature of the invention the sleeve is displaceable out of the locked position in which it extends over or at least partly overlaps the hinge against the spring restoring force so that it lies only on one of the segments so that the two segments can be folded relatively into parallel relationship. Conversely, it suffices to return the segments to their mutually aligned position, whereupon the sliding sleeve will be returned by the effect of the spring restoring force into its locking position.

In a particularly simple embodiment, the sliding sleeve can be shiftable in only one axial direction against a spring restoring force into its unlocked position.

According to another feature of the invention, the restoring spring is disposed in one of the tubular segments and engages an abutment which can pass through at least one and preferably two axial slots, to engage the sleeve. The sleeve can have an entrainment projection or formation allowing engagement of the abutment therewith. The other end of the spring can be anchored to a plug forming one of the pivot members of the hinge joint.

The two axial slits and an abutment formed as a pin engaged with the sleeve through these slits and guided therein provides an especially reliable and stable construction.

Bearing rings can be provided between the outer walls of the segments and the sleeve and such rings can be composed of a low friction and low wear synthetic resin, for example, a polyamide.

Advantageously, two pivot plugs can be provided at the mutually confronting ends of the segments and the plugs can be joined by a pair of pivotal links.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
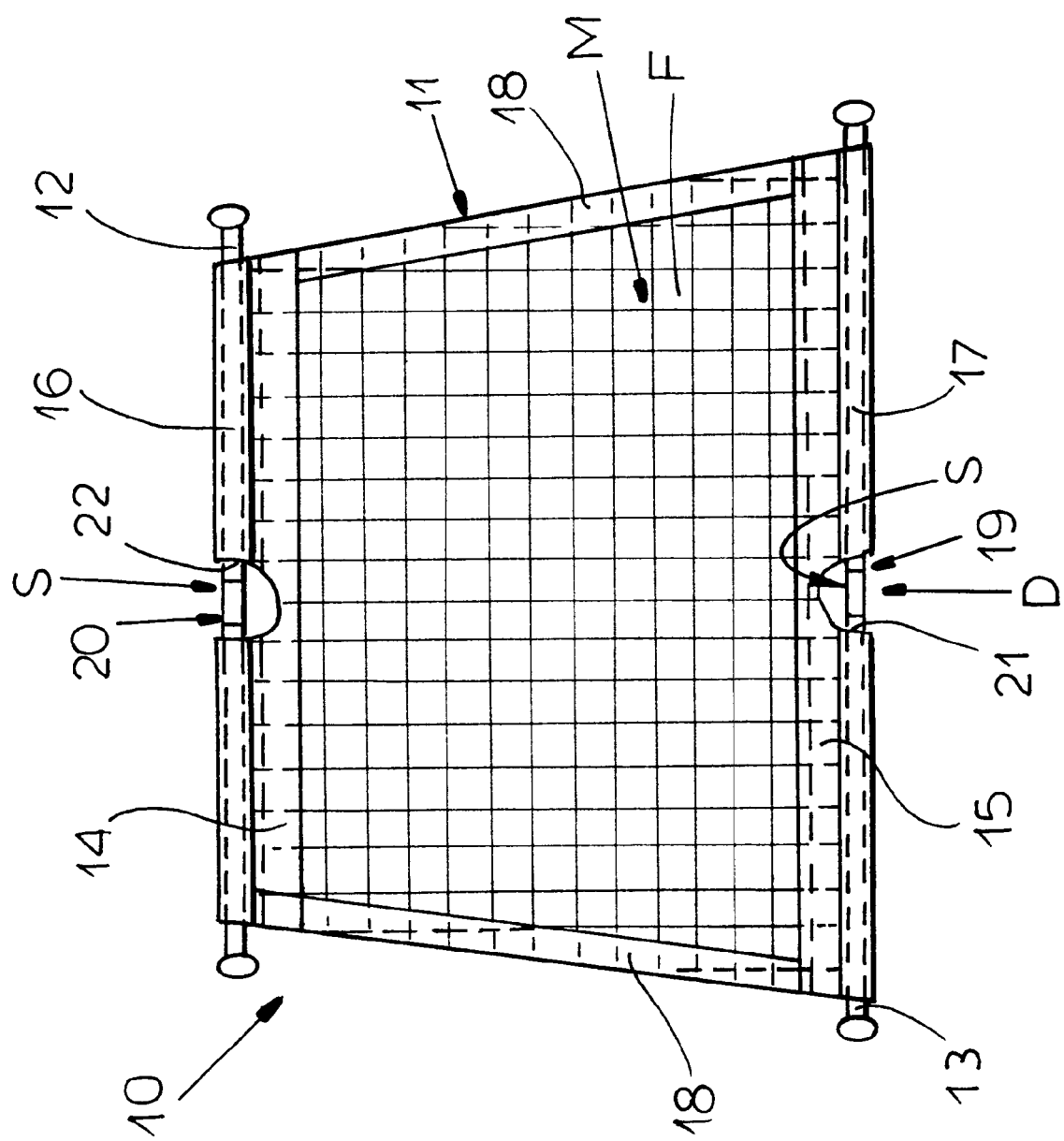
FIG. 1 is an elevational view of a retainer in accordance with the invention having a net or mesh web spanned between the mounting bars.

The web shaped retainer 10 of FIG. 1 is adapted to be mounted by a pair of holding bars 12 in the interior of a vehicle to secure that interior against the movement of objects therein.

The retainer 10, which can be used preferably in a so-called combination motor vehicle, which can be employed at least in part for the transport of goods can comprise a flexible retainer web composed of a net-like mesh M, having an openwork field F surrounded by a boarder 11.

The upper and lower edge borders 14 and 15 receive the bars 12 and 13 and can be composed of a textile reinforced foil of, for example, polyvinylchloride. The strips 14 and 15 can be bent double around the bars and can be doubled to form the edge border 11 surrounding the openwork field F. The strips 14 and 15 are sufficiently wide as to form channels 16 and 17 for the bars 12 and 13. The retainer is of trapezoidal shape so that the sides 18 converge upwardly.

Figure 2:
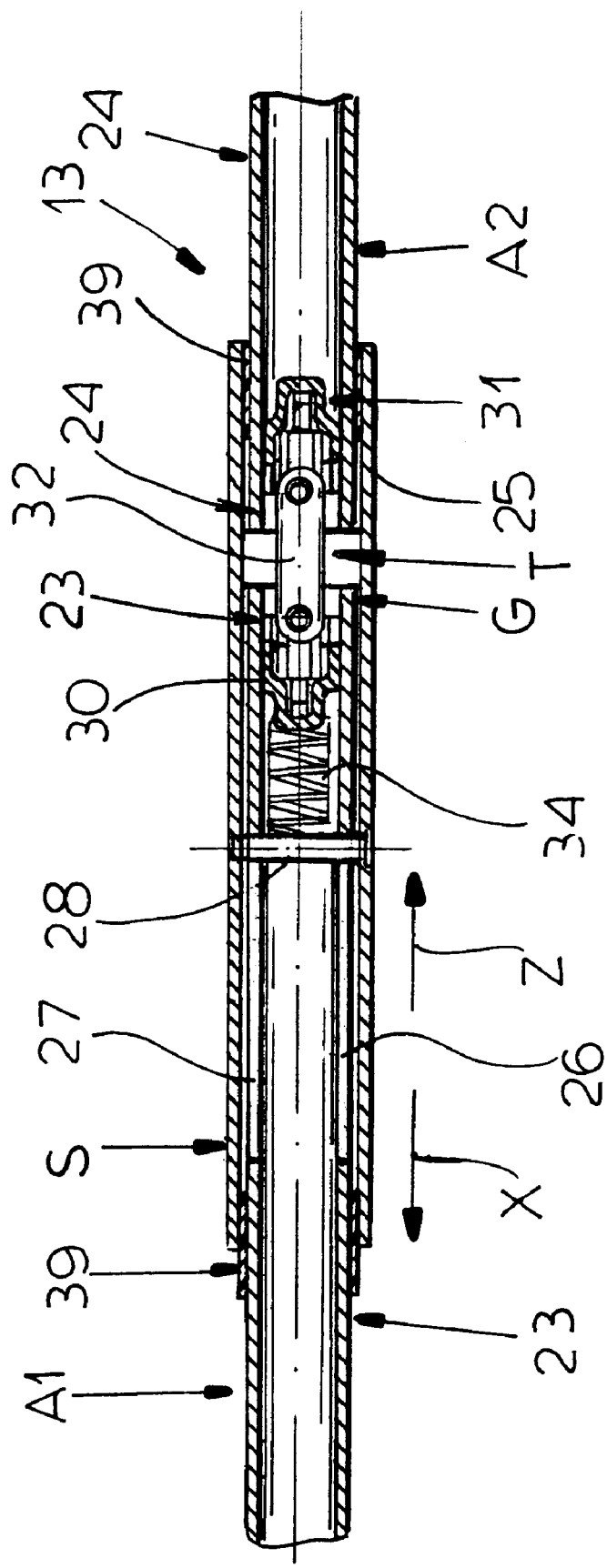
FIG. 2 is an axial segment through an intermediate folding region of one of the bars showing a detail of FIG. 1.

The central regions 19 and 20 of the bars 13 and 12 are accessible through cut outs 21 and 22 in the edge strips 15 and 14. The mechanisms of the lower bar 13 and its function have been illustrated in FIGS. 2 and 3 and it will be understood that the upper bar 12 has a similar mechanism and operates similarly.

At the separation region T, the bar 13 is subdivided into two axial segments A1 and A2 over which a slidable sleeve S is shiftable.

The sleeve S engages over the adjoining end regions 23 and 24 of the axial segments A1 and A2 which are joined together by a hinge arrangement G overlapped by an axial locking region 25 of the sleeve S. The tube wall of the segment A1 is formed with two diametrically opposite longitudinal slits 26 and 27 extending toward the separation location T and which are traversed by an abutment pin 28 extending transversely through the sleeve S. The abutment pin 28 can be a cotter pin or a spring cotter. Both ends of the pin 28 are anchored in radial bores 29 formed in the wall of the sleeve S.

To form the hinge joint G, the mutually confronting ends of the segments A1 and A2 receive plugs 30 and 31 which, form pivot members and are press fitted and/or cemented into the segment ends. The two plugs 30 and 31 are connected together by links 32 and 32' which are parallel to one another and are pivotally connected to the plugs on opposite sides thereof by pivot pins 33. In the segment A1, a helical tension spring 34 is mounted and has one spring eye 35 engaged around the pin 28 and another spring eye 36 engaged through a fastening opening 37 formed in a center projection 38 of the plug 30 within the segment A1.

Figure 3:
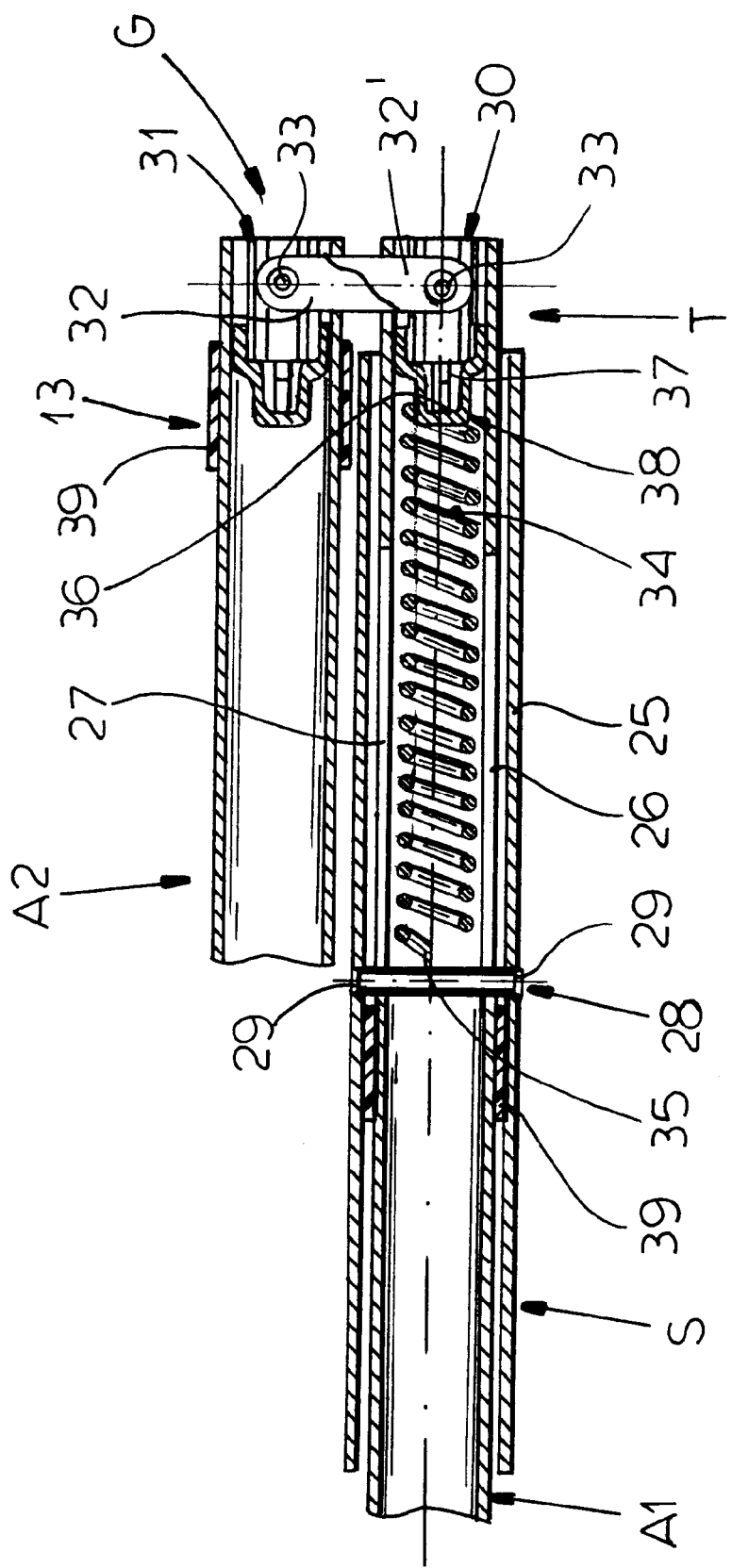
FIG. 3 is a cross sectional view enlarged with respect to FIG. 2 but also showing the region T in which the bar is subdivided and in the folded and unlocked position thereof.

When the retainer and the bar 13 are to be folded up, the sleeve S is shifted to the left relative to the two segments A1 and A2 in the direction X against the restoring force of the spring 34 so that the pin 28 moves to the left in the slots 26 and 27. The locking region 25 of the sleeve is thereby displaced until it lies fully on the segment A1 so that the segment A2 is disengaged and can be folded parallel to the segment A1 (FIG. 3).

With the two bars folded in this manner, the retainer occupies little space and can be readily stored. When, however, the segments are unfolded so that they are again aligned, the tension spring 34 displaces the sleeve S in the direction Z into the lock position of FIG. 2.

To facilitate the sliding movement of the sleeve S over the segments A1 and A2, the end regions 23, 24 thereof can be provided with plastic slide bearing rings 39, for example of polyamide.

I claim:

1. A web-shaped retainer for a vehicle interior comprising:
    a flexible retaining web adapted to span across an interior of a vehicle to retain objects therein and formed with opposite mounting edges; and
    at least one foldable bar supporting a respective one of said edges and subdivided at a separation between ends of said bar into two mutually alignable bar segments, said bar further comprising:
        a hinge joint interconnecting said segments and enabling one of said segments to be folded at said hinge joint over the other of said segments,
        a locking sleeve slidable on a first of said segments and axially shiftable from an unlocked position wherein said sleeve is fully on said first of said segments over a second of said segments upon alignment of said segments to secure said segments in axial alignment in a locking position of said sleeve, and
        a spring operatively connected to said sleeve for biasing said sleeve into said locking position, whereby said sleeve is displaceable from said locking position into said unlocked position against a spring restoring force.

2. The retainer defined in claim 1 wherein said bar segments are tubular.

3. The retainer defined in claim 2 wherein said locking sleeve is shiftable only in one axial direction against said spring restoring force into said locking position.

4. The retainer defined in claim 2 wherein said spring is received in one of said segments and is braced against a spring abutment engaging said sleeve through an unusually extending slit in the segment receiving said spring.

5. The retainer defined in claim 4 wherein said segment containing said spring is provided with two diametrically opposite longitudinal slits, said abutment comprising a pin extending through said slits and engaging said sleeve.

6. The retainer defined in claim 2 wherein said hinge joint comprises respective pivot members on said segments and a link pivotally connected to said pivot members and interconnecting same.

7. The retainer defined in claim 6 wherein said link is a flat link.

8. The retainer defined in claim 6 wherein said pivot members are interconnected by two mutually parallel links.

9. The retainer defined in claim 6 wherein said spring is engaged with a respective one of said pivot members in the segment receiving said spring.

10. The retainer defined in claim 6 wherein said spring is a tension spring.

11. The retainer defined in claim 10 wherein said spring is a helical spring.

12. The retainer defined in claim 11 wherein said helical spring is centered on a centering projection on one of said pivot members.

13. The retainer defined in claim 11 wherein one of said pivot members is formed on an interior thereof with a fastening opening receiving an eye of said spring.

14. The retainer defined in claim 13 wherein said spring has another eye engaging a pin traversing elongated slots in the segment receiving said spring and engaging said sleeve.

15. The retainer defined in claim 6 wherein said pivot members are plugs fitting into ends of said segments.

16. The retainer defined in claim 2, further comprising a respective slide bearing on each of said segments at confronting ends thereof and slidably engaging said sleeve.

17. The retainer defined in claim 16 wherein said slide bearings are rings surrounding said segments.

18. The retainer defined in claim 17 wherein said rings are comprised of synthetic resin material having a low coefficient of sliding friction.

19. The retainer defined in claim 18 wherein said rings are composed of polyamide.

* * * * *